United States Patent [19]

Ishizaka

[11] Patent Number: 4,931,966
[45] Date of Patent: Jun. 5, 1990

[54] METHOD OF MEASURING VEHICLE SPEED

[75] Inventor: Kouichi Ishizaka, Saitama, Japan

[73] Assignee: Jidosha Kiki Co., Ltd., Tokyo, Japan

[21] Appl. No.: 210,816

[22] Filed: Jun. 24, 1988

[30] Foreign Application Priority Data

Jul. 8, 1987 [JP] Japan ................... 62-168820

[51] Int. Cl.$^5$ .................... G01P 3/42; G01P 3/44
[52] U.S. Cl. ......................... 364/565; 324/168
[58] Field of Search ............ 364/565, 566, 551, 569, 364/178, 431.07; 324/166, 168, 172

[56] References Cited

U.S. PATENT DOCUMENTS

| 3,922,534 | 11/1975 | Gerstenmeier et al. | 364/565 |
|---|---|---|---|
| 4,138,723 | 2/1979 | Nehmer et al. | 364/565 |
| 4,197,585 | 4/1980 | Moorey et al. | 364/565 |
| 4,337,511 | 6/1982 | Schneider et al. | 364/565 |
| 4,434,470 | 2/1984 | Thomas et al. | 364/565 |
| 4,581,713 | 4/1956 | Fennel | 364/565 |
| 4,670,852 | 6/1987 | Masaki et al. | 364/565 |
| 4,723,213 | 2/1988 | Kawata et al. | 364/565 |
| 4,725,969 | 2/1988 | Onogi et al. | 364/565 |
| 4,748,565 | 5/1988 | Toya | 364/565 |
| 4,799,178 | 1/1989 | Spadafora et al. | 364/565 |
| 4,839,834 | 6/1989 | Omae et al. | 364/565 |

FOREIGN PATENT DOCUMENTS 62-85765  4/1987  Japan .

Primary Examiner—Felix D. Gruber
Attorney, Agent, or Firm—Blakely, Sokoloff Taylor & Zafman

[57] ABSTRACT

In a method for measuring vehicle speed, initial vehicle speed measurement after a vehicle speed measurement power supply is turned on, is based on the predicted number of pulses to occur during a time interim which is in turn based on a period of a single pulse generated by a vehicle speed signal. After a predetermined time interval has passed, vehicle speed measurement is based on the actual number of pulses generated by vehicle speed signals during that time interval.

2 Claims, 3 Drawing Sheets

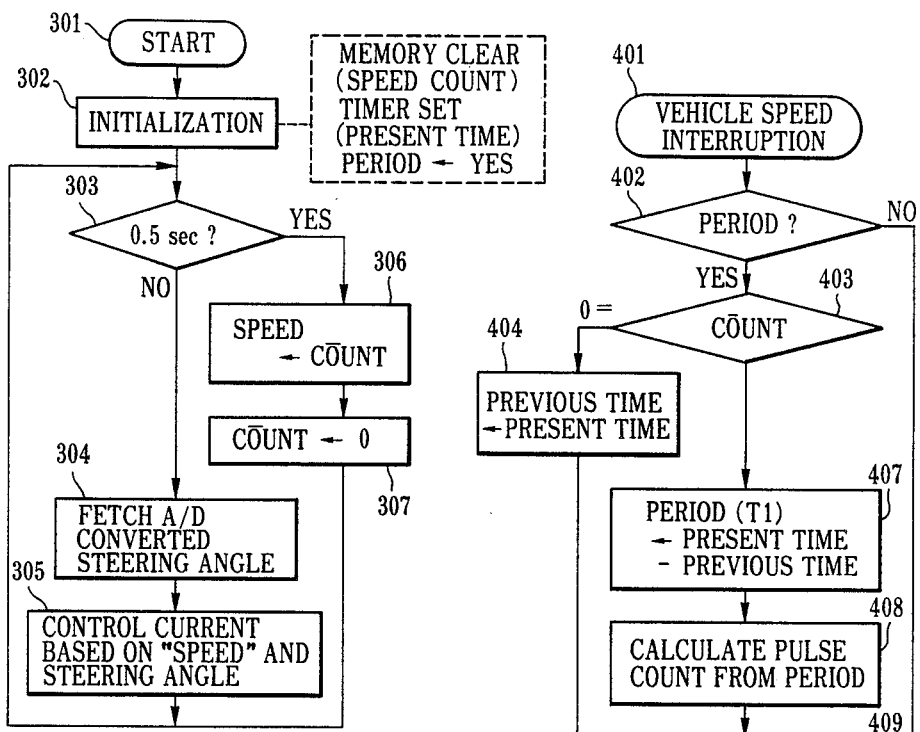
FIG.3
FIG.4
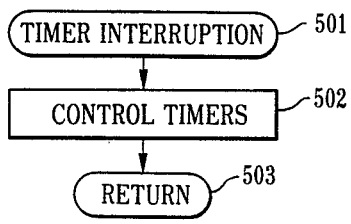
FIG.5

METHOD OF MEASURING VEHICLE SPEED

BACKGROUND OF THE INVENTION

The present invention relates to a method of measuring vehicle speed, suitable for inputting into a power steering apparatus for performing a power steering operation of a vehicle.

Current vehicles employ a power steering apparatus to facilitate a light, quick steering operation to reduce operator fatigue. More specifically, a pump using an engine as a power source, exerts an appropriate steering force to assist the operator in steering the vehicle. In such a power steering system, a steering angle, an engine speed, a vehicle speed, and the like are inputted into a controller (incorporating a microcomputer). A solenoid valve is driven in accordance with these parameters so as to control a hydraulic pressure supplied to a hydraulic pressure reaction chamber. This results in an optimal steering force.

In the power steering apparatus, vehicle speed measurement in the microcomputer is based on the number of pulses which are generated by vehicle speed signal inputs. The period of a generated pulse varies with vehicle speed. More specifically, as shown in FIG. 6, the number of pulses generated by inputs of a vehicle speed, A, during a predetermined sampling time interval, T, is counted. Vehicle speed measurement is based on this count value. The vehicle speed measurement value is updated after the next sampling time interval, T, has passed. Each time the predetermined sampling time interval, T, has passed, vehicle speed measurement is again performed, based on the number of generated pulses occurring during that time interval. Thus the vehicle speed measurement value used is updated after each time interval.

However, with the above-mentioned method of measuring vehicle speed, instantaneous disconnection of the power supply of the microcomputer, causes the microcomputer to be reset. As a result, the vehicle speed measurement value is left indefinite until the predetermined sampling time interval, T, has passed after the drive power supply has recovered from disconnection. In the power steering system, when the vehicle speed measurement value is left indefinite, the vehicle speed is set equal to zero. The resulting hydraulic pressure supplied to the hydraulic pressure reaction chamber increases the auxiliary steering force. This in turn reduces the actual steering force required of the operator.

The above scenario is especially dangerous when travelling at high speeds. At high speeds, the actual steering force required from the operator is high. However, should the power source be disconnected and the vehicle speed value be set to zero, the required actual steering force is now very low due to the increased auxiliary steering force. Such an abrupt change in actual steering force, unbeknownst to the operator, may result in incorrect steering with lethal consequences. The sampling time interval, T, must pass before the vehicle speed value is corrected. During this considerable amount of time, the dangerous condition exists.

SUMMARY OF THE INVENTION

To remedy the above danger, a principal objective of the present invention is to provide a method of measuring vehicle speed wherein an initial vehicle speed value is determined in a short period of time.

In order to achieve the above objective, the invention provides a method wherein an initial vehicle speed measurement is based on a prediction of the number of generated pulses to occur during the sampling time interval. Specifically, once the vehicle speed measurement power supply has recovered after instantaneous disconnection, a prediction of the number of pulses which will be generated during the sampling time interval, is based on the period of the first generated pulse. Thus the time required to calculate initial vehicle speed is shortened from the sampling time interval of the period of the first pulse generated by a vehicle speed input.

Once the sampling time interval has passed however, the actual number of pulses generated is used to measure vehicle speed instead of the predicted value. Thereafter, the number of pulses per sampling time interval is continuously updated so that optimum accuracy is maintained.

According to the present invention, the time required for determining an initial vehicle speed measurement value after a vehicle speed measurement power supply is turned on (e.g. recovered from instantaneous disconnection) is shortened.

BRIEF DESCRIPTION OF THE DRAWINGS

FIGS. 3 to 5 are flow charts for explaining a vehicle speed measuring operation after a drive power supply for a microcomputer is turned on in the power steering system shown in FIG. 2.

DESCRIPTION OF THE PREFERRED EMBODIMENT

A method of measuring a vehicle speed according to the present invention will be described in detail with reference to the accompanying drawings.

Figure 1:
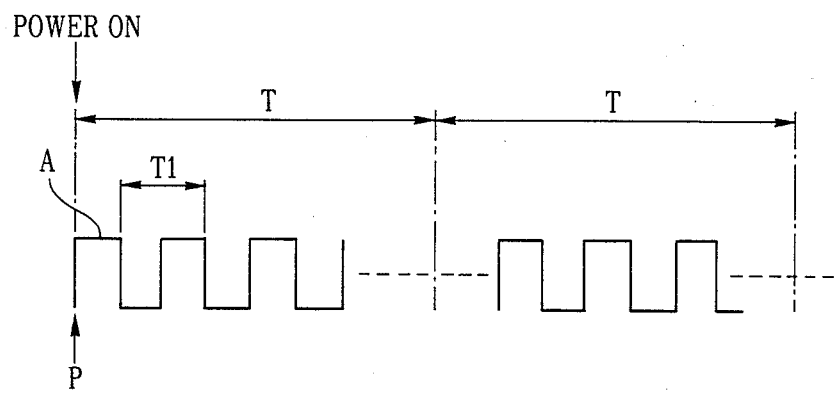
FIG. 1 is a view for explaining the method of measuring a vehicle speed by predicting the number of pulses based on the period of one pulse.
Figure 6:
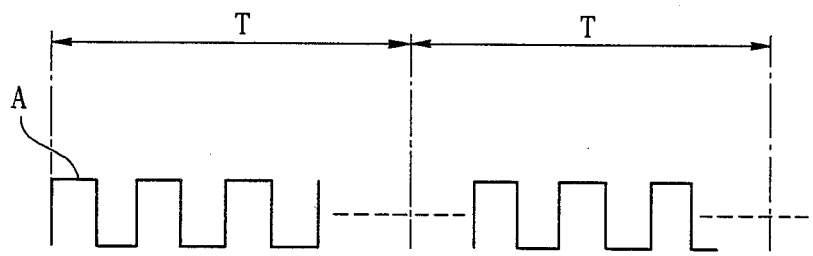
FIG. 6 is a view for explaining the principle of a conventional method of measuring vehicle speed.

The principle of the method of the present invention will be described with reference to FIG. 1. In FIG. 1. assume that a vehicle speed measurement power supply has recovered from instantaneous disconnection at a point P. In this case, the number of pulses to be generated during a predetermined sampling time interval, T, is predicted based on an initial pulse period, T1, of a vehicle speed signal A. The vehicle speed measurement is then performed and is based on this predicted number of pulses. After the initial sampling time interval T has passed, vehicle speed measurement is based on the number of pulses actually generated during the sampling time interval T.

As noted above, this method of measuring vehicle speed after instantaneous disconnection of the drive power supply to the microcomputer shortens calculation time. Thus, the time for which an auxiliary steering force is increased based on an indefinite vehicle speed is shortened. This results in a shorter time period in which incorrect steering may occur.

The pulse period of the vehicle speed signal is shortened as vehicle speed increases. Therefore, the time required to determine vehicle speed based on this initial pulse period is likewise shortened as vehicle speed increases. Thus, as a vehicle travels at higher speed, the time required to recover from an abrupt change in steering force is shortened and a safe drive operation is assured.

Figure 2:
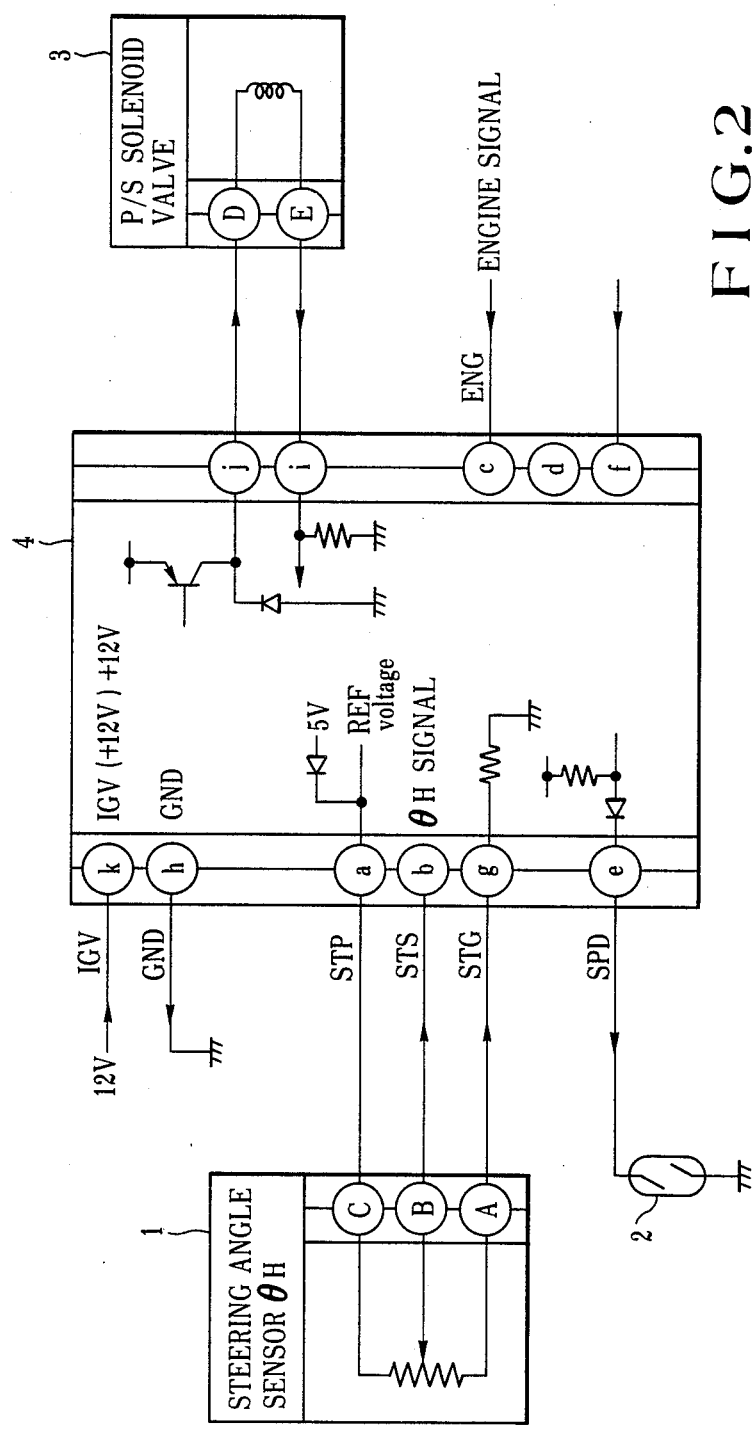
FIG. 2 is a block diagram showing an embodiment of a power steering system to which the method of measuring a vehicle speed according to the present invention is applied.

FIG. 2 shows an embodiment of the power steering system to which the method of the present invention is applied. In FIG. 2, reference numeral 1 denotes a steering angle sensor for outputting a voltage signal (steering angle signal) in accordance with steering angle; 2, a vehicle speed sensor for generating a pulsed electrical signal (vehicle speed signal) in accordance with vehicle speed; 3, a solenoid valve for controlling a hydraulic pressure supplied to a hydraulic pressure reaction chamber; and 4, a controller. The controller 4 receives the signals which are output from the steering angle and vehicle speed sensors 1 and 2, and a pulse signal (engine signal) corresponding to an engine speed. The operating state of a vehicle is detected by a microcomputer (not shown) in the controller 4 which supplies a current to the solenoid valve 3 based on these inputted signals. The current supplied to the solenoid valve 3 is a PWM-controlled in accordance with the detected operating state.

In a power steering system with the above arrangement, vehicle speed measurement, after instantaneous disconnection of a drive power supply to the microcomputer, is performed based on the vehicle speed signal input through the vehicle speed sensor 2 as follows. When the drive power supply to the microcomputer has recovered from instantaneous disconnection, an operation program in the microcomputer is restarted (step 301 in FIG. 3). In step 302, values for the variables SPEED, COUNT, PRESENT TIME, and PERIOD memories are initialized. That is, the values in the SPEED, COUNT, and PRESENT TIME memories are set at zero, and a "YES" state is set in the PERIOD memory. In step 402 shown in FIG. 4, the state of the PERIOD memory is checked. Since the "YES" state is set in the PERIOD memory, the flow advances to step 403 to check the present value of the COUNT memory. Since the value of the COUNT memory is set at zero in previous step 302, the flow advances to step 404, and the value of the PRESENT TIME memory is transferred to a PREVIOUS TIME memory. The value of the PRESENT TIME memory corresponds to the amount of time which has elapsed after the value of the PRESENT TIME memory is set to zero up until a timer interruption process as shown in FIG. 5 occurs. After step 404 is executed, the value of the COUNT memory is incremented by 1 in step 405 in response to the pulse generated by the vehicle speed signal input. That is, at this time, the value of the COUNT memory becomes 1, and upon the next execution of step 403, step 407 occurs in which the value of the PREVIOUS TIME memory is subtracted from the value of the PRESENT TIME memory at that time, and the difference is written in the T1 PERIOD memory as the period of the pulse generated by the first vehicle speed signal after the microcomputer has restarted. In step 408, a prediction of the number of pulses to be generated by vehicle speed signal inputs in a predetermined sampling time interval (in this embodiment, 0.5 sec) is based on the value written in the T1 PERIOD memory. The predicted number of pulses is written in the SPEED memory (step 409). In step 410, a "NO" state is set in the PERIOD memory. Therefore, the value of the COUNT memory is incremented by 1 each time a pulse generated by a vehicle speed signal is input in step 405.

Step 303 dictates that steps 304 and 305 are repetitively executed until 0.5 sec has passed from the initialization executed in step 302. In step 304, a steering angle is retrieved as an A/D-converted value based on the steering angle signal. In step 305 a current supplied to the solenoid valve is PWM-controlled based on the A/D-converted value of the steering angle and the value of the SPEED memory. Recall that at this point, the SPEED memory value is the predicted value as determined in steps 408 and 409. More specifically, until 0.5 sec have passed in step 303, vehicle speed is calculated based on the predicted number of generated puses of the vehicle speed signal calculated in step 409. The current supplied to the solenoid valve is PWM-controlled and is based on this predicted vehicle speed. After 0.5 sec have passed, the actual number of pulses generated by vehicle speed signal inputs counted at every 0.5-sec intervals (the value of the COUNT memory) is transferred to the SPEED memory (steps 306, 307). Thus, vehicle speed is calculated based on the number of pulses actually generated and a current supplied to the solenoid valve is PWM-controlled based on this vehicle speed.

As described above, the present invention sets forth a method for calculating initial vehicle speed after a vehicle speed measurement power supply has been instantaneously disconnected and then turned on again. This calculation is based on the period of a single pulse generated by a vehicle speed signal. Therefore, the time required for determining initial vehicle speed is reduced from some predetermined sampling time interval to the period of a single pulse. When this method is applied to a power steering apparatus, the time required to recover from an abrupt change in steering force due to instantaneous disconnection of the vehicle speed measurement power supply is shortened. This assures a safe operation during high-speed travel by eliminating a considerable time span during which a vehicle operator could unknowingly apply an incorrect steering force.

What is claimed is:

1. A method of measuring vehicle speed comprising the steps of:
   (a) determining an initial vehicle speed;
   (b) receiving a plurality of vehicle speed signal inputs;
   (c) generating pulses corresponding to said vehicle speed signal inputs;
   (d) counting the number of pulses generated during a predetermined time interval;
   (e) calculating vehicle speed based on said number of counted pulses generated during said predetermined time interval;
   wherein said initial vehicle speed determining step includes the steps of:
   (i) receiving a first vehicle speed signal pulse after a vehicle speed measurement power supply has been turned on;
   (ii) generating a second vehicle speed signal pulse having a period corresponding to said first vehicle speed signal pulse;
   (iii) measuring the period of said generated pulse;
   (iv) predicting a number of pulses, which will be generated during said predetermined time interval corresponding to said first and second vehicle speed signal pulses, based upon the measured period;
   (v) determining said initial vehicle speed based on said predicted number of pulses.

2. A method according to claim 1, wherein subsequent vehicle speed measurement is performed within one clock period.

* * * * *